No. 617,112. Patented Jan. 3, 1899.
D. MACKAY.
APPARATUS FOR PREPARING SOIL FOR PLANTING.
(Application filed Oct. 30, 1897.)
(No Model.) 2 Sheets—Sheet 1.

Witnesses
Jas. H. McCathran
V. B. Hillyard.

Inventor
David Mackay
By his Attorneys,

THE NORRIS PETERS CO., PHOTO-LITHO., WASHINGTON, D. C.

No. 617,112. Patented Jan. 3, 1899.
D. MACKAY.
APPARATUS FOR PREPARING SOIL FOR PLANTING.
(Application filed Oct. 30, 1897.)
(No Model.) 2 Sheets—Sheet 2.
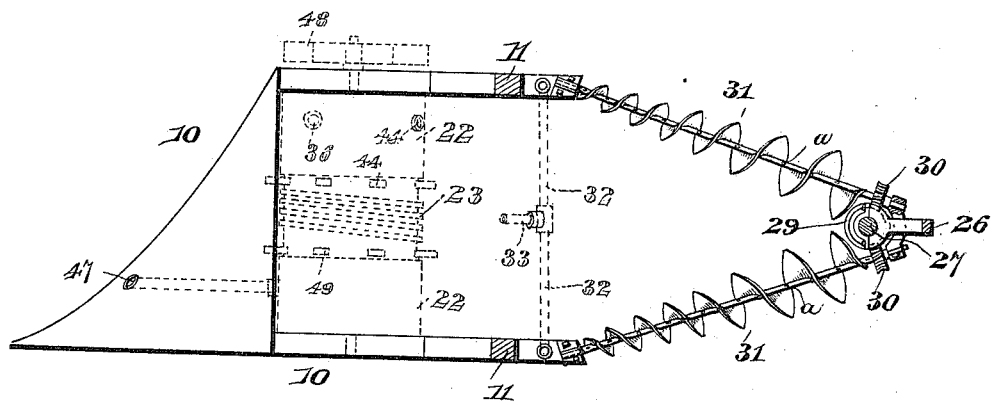
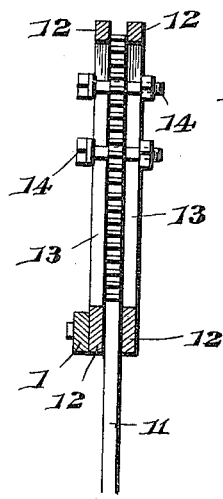
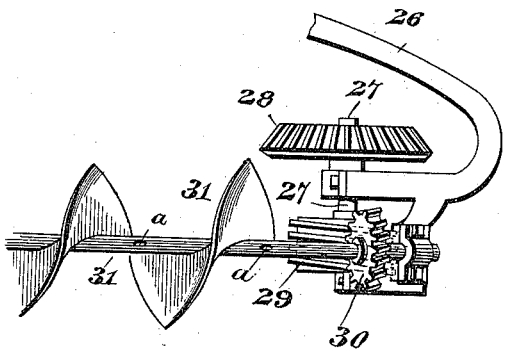
Witnesses
Jas. W. McCathran
U. B. Hillyard
Inventor
David Mackay
By his Attorneys,
C. A. Snow & Co.

UNITED STATES PATENT OFFICE.

DAVID MACKAY, OF DALLAS, TEXAS.

APPARATUS FOR PREPARING SOIL FOR PLANTING.

SPECIFICATION forming part of Letters Patent No. 617,112, dated January 3, 1899.

Application filed October 30, 1897. Serial No. 656,951. (No model.)

*To all whom it may concern:*

Be it known that I, DAVID MACKAY, a citizen of the United States, residing at Dallas, in the county of Dallas and State of Texas, have invented a new and useful Apparatus for Preparing Soil for Planting, of which the following is a specification.

It has been discovered that steam and like medium can be advantageously and successfully utilized in preparing soil for the reception of seed, said medium being directed against the soil in such a manner as to turn, loosen, and aerate it, which are essential requisites to a full crop under favorable conditions. This method of treating the soil not only loosens, aerates, and pulverizes it, but at the same time destroys all plant and insect life, thereby lessening the subsequent labor of weeding and cultivating.

Within the scope of this invention the steam or like medium may be used direct; but it is preferred to previously employ it as a means for propelling the machine or implement over the ground and to inject the spent steam into the furrow, so as to assist the plowshare or shovel in turning the soil and attaining the results hereinbefore mentioned.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 5:
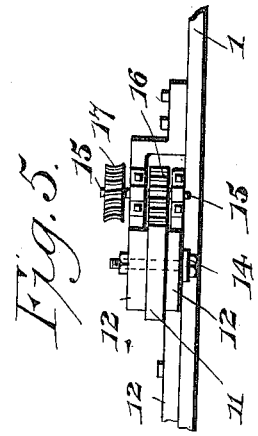
Figure 6:
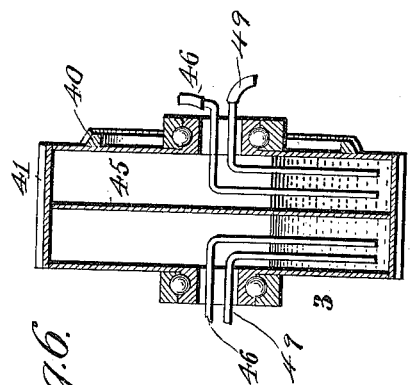
Figure 1:
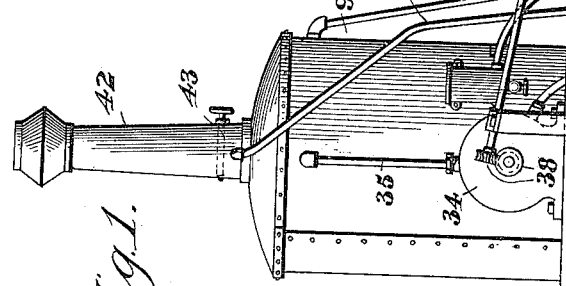

Figure 1 is a side elevation of a machine or implement for carrying into effect the objects of this invention. Fig. 2 is a top plan view of the plowshare, showing the means for loosening the bottom of the furrow in the rear of the shovel or opener. Fig. 3 is a detail view in elevation of the instrumentalities for transmitting motion to the screws or cutters provided for acting upon the bottom of the furrow. Fig. 4 is a detail view of the means for directing the plow in its vertical movements. Fig. 5 is a detail plan view of the mechanism for raising and lowering the plow or furrow-opener. Fig. 6 is a vertical central section of the rear or drive wheel.

Corresponding and like parts are referred to in the following description and indicated in the several views of the accompanying drawings by the same reference characters.

In accordance with the spirit of this invention steam or like medium is directed against the soil to be treated, and, as intimated herein, the soil is loosened, aerated, pulverized, and insect and plant life destroyed thereby. The steam may be taken directly from a suitable generator or it may be utilized for operating an engine for propelling the machine over the field and when exhausted or spent may be caused to impact against the soil, so as to attain the ends in view.

Any suitable mechanism may be devised for utilizing the steam or other medium for carrying into effect the purposes hereinbefore outlined, and, as shown in Fig. 1, the machine comprises a frame 1, front wheels 2, and a rear wheel 3, the front wheels 2 being mounted upon an axle 4, which is adapted to be turned for directing the machine in its travel over the field, said axle being moved by means of chains 5, a transverse shaft 6, and a vertical shaft 7, intermeshing with the transverse shaft 6 through suitable gearing and having a hand-wheel 8 at its upper end for convenience in turning the shaft 7 to steer the machine along the desired course.

A boiler or steam-generator 9 is mounted upon the front end of the frame 1 and may be of any of the usual varieties.

A plowshare or furrow-opener 10 has adjustable connection with the frame 1 by means of a standard 11, which is toothed at its rear edge and operates between vertical uprights 12, secured at their lower ends to the frame 1 and having slots 13, in which operate bolts 14, passing through the standard 11, so as to direct the plowshare in its vertical movements and secure it, when desired, in an adjusted position. A shaft 15, journaled in bearings applied to the uprights 12, has a pinion 16, intermeshing with the toothed edge of the standard 11, and is provided at one end with a pinion 17, intermeshing with a worm-gear 18 on the front end of a longitudinally-disposed shaft 19, mounted in bearings at the upper ends of standards 20 and having a hand-wheel 21 at its rear end to be operated when it is required to adjust the plow 10 or furrow-opener to any required elevation.

An engine 22 of the rotary type is applied to the plowshare or furrow-opener in the rear of its cutting edge and is actuated by the steam or medium employed for treating the soil. A worm-gear 23 is provided around the circumference of the engine at an intermediate point, and a pinion 24 intermeshes therewith and is applied to a longitudinal shaft 25, journaled in bearings applied to the plowshare and to a bracket 26, extending rearwardly from the standard 11. A vertical shaft 27, journaled to the rear portion of the bracket 26, receives motion from the shaft 25 by means of intermeshing gearing 28 and is provided at its lower end with a worm-gear 29, intermeshing with pinions 30, secured to the rear ends of screws 31, forwardly divergent and journaled to the plowshare and bracket 26, respectively, as indicated most clearly in Fig. 2. These screws 31 taper from rear to front, and by reason of their divergent relation cover the entire bottom of the furrow and are placed so as to cut the said bottom of the furrow to loosen and lighten it, whereby moisture will penetrate the soil and admit of the plants receiving more nourishment, whereby a better crop is had. A transverse pipe 32 communicates at its ends with the front bearings of the screws 31 and is connected midway of its ends, by means of a pipe 33, with the boiler or engine, whereby the live or exhaust steam is carried to the furrow through lateral openings $a$ in the hollow shafts of the screws for the purposes herein set forth.

An engine or rotary motor 34 is placed upon the front end of the frame 1, and steam is supplied thereto from the boiler by means of a pipe 35, and the spent or exhaust steam is conveyed from the engine 34 to the engine 22 by means of a pipe 36, and this engine 34 is utilized for propelling the machine over the field by means of the following instrumentalities: A longitudinal shaft 37 is driven from the engine 34 by worm-gearing 38 and is provided at its rear end with a pinion 39 in mesh with crown-gearing 40 at one end of the rear wheel 3, whereby the latter is positively rotated, and the traction between it and the surface of the ground is sufficient to cause the machine to advance when the engine 34 is in operation. To further increase the traction between the surface of the ground and the wheel 3, the latter is provided around its periphery with projections 41, whereby slipping is obviated, as will be readily understood.

The smoke-stack 42 of the boiler is provided with a damper 43, which when closed deflects the hot air and gases through a pipe 44 into the engine 22, where they are utilized for superheating the moist steam and are subsequently injected into the furrow with the spent steam when the latter escapes. This heat, which would otherwise be lost, is utilized for destroying insect life and objectionable growths in the soil when breaking the land preparatory to planting.

The boiler or steam-generator 9 may be heated in any of the usual ways and is supplied with water from a tank or reservoir, which in the present instance is a compartment of the ground-wheel 3, said ground-wheel being subdivided by a partition 45 into chambers, one of which receives the water and the other a hydrocarbon, which is consumed for converting the water into steam, suitable pipes 49 extending from the boiler to the respective compartments of the drive-wheel for conveying the water and hydrocarbon thereto. The water or oil, as the case may be, is supplied to the respective compartments of the ground-wheel by means of pipes 46, which enter the ground-wheel through its hollow bearings.

A pipe 47 communicates with an opening near the cutting edge of the share or plow point and conveys the steam to the bottom of the furrow, so as to attain the several objects herein enumerated. As shown, this pipe has connection with the engine 22, so as to convey the spent steam into the furrow.

A cutter 48 is located at the delivery side of the plow to scatter the steam and prevent the soil being blown off too far, and the traction is assisted by points 49, applied to the rotary engine 22, these points entering the ground and preventing slipping of the engine thereon when in motion. The steam or like medium emerging from the pipe 47 impacts against the slice of earth being turned by the share and is deflected laterally toward the delivery side of the share and, coming in contact with the blades of the cutter 48, is checked and scattered. The earth carried along laterally with the steam is likewise scattered and prevented from being blown off to a great distance from the side of the machine.

Having thus described the invention, what is claimed as new is—

1. In an agricultural implement, the combination with the machine, a primary steam-engine or like motor for propelling the machine over the field, and means for supplying steam or like motive medium to the primary engine, of a furrow-opener, an engine supported and carried by the furrow-opener, and means for conveying the exhaust from the primary engine to the engine supported by the furrow-opener, substantially as described.

2. In combination with a boiler or steam-generator a hollow ground-wheel provided with hollow bearings and having a partition dividing it into vertical chambers or compartments one of which receives water and the other hydrocarbon, pipes leading from the respective chambers or compartments out through the hollow bearings of the said hollow ground-wheel for conveying the hydrocarbon and water to the boiler, and supply-pipes passing through the hollow bearings of the wheel and communicating with the compartments or chambers thereof, substantially as described.

3. In an agricultural implement, the combination with a share, of a steam-engine or like motor located in the rear of the share, means for supplying steam or like motive medium to the engine, means for conveying the spent motive medium into the furrow formed by the share, and a cutter located at the delivery side of the share, substantially as and for the purpose specified.

4. In an agricultural implement, the combination with the frame, a steam-generator supported by the frame, and a plowshare, of a rotary engine journaled to the plowshare and adapted to travel upon the ground, means for conveying steam from the generator to the engine, and points applied to the rotary engine to enter the ground, substantially as described for the purpose specified.

5. In an agricultural implement, the combination with a share, of a steam engine or driver located in the rear of the share, and means for supplying steam or like motive medium to the engine for actuating it and for conveying the spent medium into the furrow formed by the share, substantially as set forth.

6. In an agricultural implement, the combination with the frame, of a share and rotary engine mounted to move in unison, and means for vertically adjusting the share and engine for regulating the depth of plowing, substantially as set forth.

7. In an agricultural implement, the combination of a drive-wheel, a steam-engine for operating the drive-wheel, a furrow-opener, and means for supplying steam or like motive medium to the engine and for directing the spent motive medium into the furrow, substantially as and for the purpose set forth.

8. In an agricultural implement, the combination of a furrow-opener bearing an engine, a primary steam-engine for propelling the machine over the field, means for supplying steam or like motive medium to the primary engine and for conveying the exhaust motive medium from the primary engine to the engine supported by the furrow-opener, and means for directing the spent motive medium from the engine of the furrow-opener into the furrow, substantially as and for the purpose set forth.

9. The combination with a furrow-opener, of a screw-cutter located in the rear thereof and disposed obliquely to the line of motion, substantially as set forth for the purpose specified.

10. The combination with a furrow-opener, of a tapering screw-cutter located in the rear thereof and disposed obliquely to the line of motion in the manner and for the purpose described.

11. The combination with a furrow-opener, of forwardly-divergent cutters located in the rear thereof for loosening the bottom of the furrow, as and for the purpose set forth.

12. The combination with a furrow-opener, of a pair of cutters located in the rear thereof for loosening the bottom of the furrow, and means for imparting a simultaneous rotary movement to the cutters, substantially as specified.

13. The combination with a furrow-opener, of a cutter placed in the rear thereof for acting upon the bottom of the furrow, and means for directing a jet of steam or like medium against the cutter and into the furrow, substantially as and for the purpose set forth.

14. In combination, a frame having slotted uprights, a furrow-opener having a standard located in the space between the said uprights and having lateral extensions operating in the slots thereof, a shaft having a pinion intermeshing with a toothed portion of the standard, and a second shaft having a hand-wheel at one end and intermeshing with the shaft bearing the aforesaid pinion, substantially as described for the purpose set forth.

In testimony that I claim the foregoing as my own I have hereto affixed my signature in the presence of two witnesses.

DAVID MACKAY.

Witnesses:
M. M. TOOLE,
W. H. DE BORD.